(12) United States Patent
Nass et al.

(10) Patent No.: US 8,249,579 B2
(45) Date of Patent: Aug. 21, 2012

(54) REPROGRAMMING NODES IN A WIRELESS AUTOMATION SYSTEM

(75) Inventors: Geoffrey D. Nass, Rolling Meadows, IL (US); Norman R. McFarland, Palatine, IL (US)

(73) Assignee: Siemens Industry, Inc., Alpharetta, GA (US)

(*) Notice: Subject to any disclaimer, the term of this patent is extended or adjusted under 35 U.S.C. 154(b) by 1065 days.

(21) Appl. No.: 11/846,130

(22) Filed: Aug. 28, 2007

(65) Prior Publication Data
US 2008/0057931 A1 Mar. 6, 2008

Related U.S. Application Data

(60) Provisional application No. 60/823,916, filed on Aug. 30, 2006, provisional application No. 60/823,807, filed on Aug. 29, 2006.

(51) Int. Cl.
*H04M 3/00* (2006.01)
*H04M 1/68* (2006.01)
(52) U.S. Cl. .................. 455/420; 455/419; 455/411
(58) Field of Classification Search .............. 455/419, 455/411, 420
See application file for complete search history.

(56) References Cited

U.S. PATENT DOCUMENTS

| 2006/0056370 A1* | 3/2006 | Hancock et al. ............... 370/338 |
| 2006/0287001 A1* | 12/2006 | Budampati et al. ......... 455/552.1 |
| 2007/0072599 A1* | 3/2007 | Romine et al. ................ 455/423 |

FOREIGN PATENT DOCUMENTS

| WO | WO 03/044684 A | 5/2003 |
| WO | WO 2005/004368 A2 | 1/2005 |

OTHER PUBLICATIONS

International Search Report dated Aug. 4, 2008 for Application No. PCT/US2007/077102.

* cited by examiner

*Primary Examiner* — Kamran Afshar
*Assistant Examiner* — Omoniyi Obayanju

(57) ABSTRACT

A method for wireless communication within a building automation system is disclosed. The method includes establishing a communication connection between a wireless device and a controller, and communicating an upgrade packet to the wireless device from the controller. The method further includes executing the upgrade packet to upgrade the wireless device or a building automation component connected to the wireless device. A building automation system is further disclosed. The system includes a controller configured to provide a software module, and a wireless transceiver in communication with the controller and configured to communicate the software module. The system further includes a wireless device in communication with the wireless transceiver and configured to receive the software module to upgrade the wireless device.

24 Claims, 4 Drawing Sheets

REPROGRAMMING NODES IN A WIRELESS AUTOMATION SYSTEM

CROSS REFERENCE TO RELATED APPLICATIONS

This patent claims the priority benefit under 35 U.S.C. §119(e) of U.S. provisional patent application Ser. No. 60/823,916, filed on Aug. 30, 2006, and U.S. provisional patent application Ser. No. 60/823,807, filed on Aug. 29, 2006, the contents of which are hereby incorporated by reference for all purposes.

This patent relates to co-pending U.S. patent application Ser. No. 11/590,157, filed on Oct. 31, 2006 which claims the priority benefit under 35 U.S.C. §119(e) of U.S. provisional patent application 60/823,906, filed on Aug. 30, 2006, and to co-pending U.S. patent application Ser. No. 10/915,034, filed on Aug. 8, 2004, the contents of these applications are hereby incorporated by reference for all purposes.

BACKGROUND

The present disclosure generally relates to building automation systems. In particular, the present disclosure relates to wirelessly reprogramming and updating wired and wireless building automation components within a building automation system.

A building automations system (BAS) typically integrates and controls elements and services within a structure such as the heating, ventilation and air conditions (HVAC) system, security services, fire systems and the like. The integrated and controlled systems are arranged and organized into one or more floor level networks (FLNs) containing application or process specific controllers, sensors, actuators, or other devices distributed or wired to form a network. The floor level networks provide general control for a particular floor or region of the structure. For example, a floor level network may be an RS-485 compatible network that includes one or more controllers or application specific controllers configured to control the elements or services within a floor or region of the structure. The controllers may, in turn, be configured to receive an input from a sensor or other device such as, for example, a temperature sensor (RTS) deployed to monitor a room, floor or region of the structure. The input provided to the controller, in this example, may be a temperature indication representative of the physical temperature detected within a given floor or region of the structure. The temperature indication can be utilized by a process control routine such as a proportional-integral control routine executed by the controller to drive or adjust a damper, heating element, cooling element or other actuator towards a pre-defined set-point.

Information such as the temperature indication, sensor readings and/or actuator positions provided to one or more controllers operating within a given floor level network may, in turn, be communicated to an automation level network (ALN) or building level network (BLN) configured to, for example, execute control applications, routines or loops, coordinate time-based activity schedules, monitor priority based overrides or alarms and provide field level information to technicians. Building level networks and the included floor level networks may, in turn, be integrated into an optional management level network (MLN) that provides a system for distributed access and processing to allow for remote supervision, remote control, statistical analysis and other higher level functionality. Examples and additional information related to BAS configuration and organization may be found in the co-pending U.S. patent application Ser. No. 11/590,157 (2006P18573US), filed on Oct. 31, 2006, and co-pending U.S. patent application Ser. No. 10/915,034 (2004P13093US), filed on Aug. 8, 2004, the contents of these applications are hereby incorporated by reference for all purposes.

Wireless devices such as devices that comply with IEEE 802.15.4/ZigBee protocols may be implemented within the control scheme of a building automation system without incurring additional wiring or installation costs. ZigBee-compliant devices such as full function devices (FFD) and reduced function devices (RFD) may be interconnected to establish or provide a device net or mesh within the building automation system. For example, full function devices are designed with the processing power necessary to establish peer-to-peer connections with other full function devices and/or execute control routines specific to a floor or region of a floor level network. Each of the full function devices may, in turn, communicate with one or more of the reduced function devices in a hub and spoke arrangement. Reduced function devices such as the temperature sensor described above are designed with limited processing power necessary to perform a specific task(s) and communicate information directly to the connected full function device.

Wired and wireless devices utilized in a building automation system typically have a service life of between ten (10) and twenty (20) years. During that period wired or wireless communications standards can be expected to change and evolve to incorporate new software features, component capabilities and industry requirements. Components of the building automation system may become obsolete or incompatible with other aspects or components of an existing building automation system that conforms to updated communications standards or protocols.

SUMMARY

The present disclosure generally provides for methods, systems, computer readable media, and tools for configuring, upgrading, or communicating with wireless devices and other BAS components in communication with a wired or wireless communications network. Upgrade software such as a firmware program, a software module, an instruction packet, a database and/or other computer executable instructions may be are stored on a source node such as, for example, a controller, processor, wireless device, server, laptop or other computer. The upgrade software may, in turn, be communicated to wireless devices and other BAS components in communication with the source node via the wired or wireless communications network for upgrade and execution.

In one embodiment, a method for wireless communication within a building automation system is disclosed. The method includes establishing a wireless communication connection between a controller or source node and an automation component and/or a wireless device, and communicating an upgrade packet to the automation component from the controller or source node. The method further includes executing the upgrade packet to upgrade the automation component.

In another embodiment, a building automation system is disclosed. The system includes a controller or source node configured to provide a software module, and a wireless transceiver in communication with the controller or source node and configured to communicate the software module. The system further includes a wireless device in communication with the wireless transceiver, wherein the wireless device is upgradeable in response to receiving the communicated software module.

In another embodiment, a method for wireless communication within a building automation system is disclosed. The method includes providing firmware to a building automation component and wirelessly communicating the firmware to a wireless device. The method further includes executing the firmware on a processor within the wireless device to upgrade the wireless device.

Additional features and advantages of the present invention are described in, and will be apparent from, the following Detailed Description and the figures.

BRIEF DESCRIPTION OF THE FIGURES

The method, system and teaching provide for programming, reprogramming and updating wireless devices within a building automation system (BAS). The method, system and teaching further provide for fast and efficient interactions with a single wireless device or multiple wireless devices distributed throughout a BAS.

DETAILED DESCRIPTION

Figure 1:
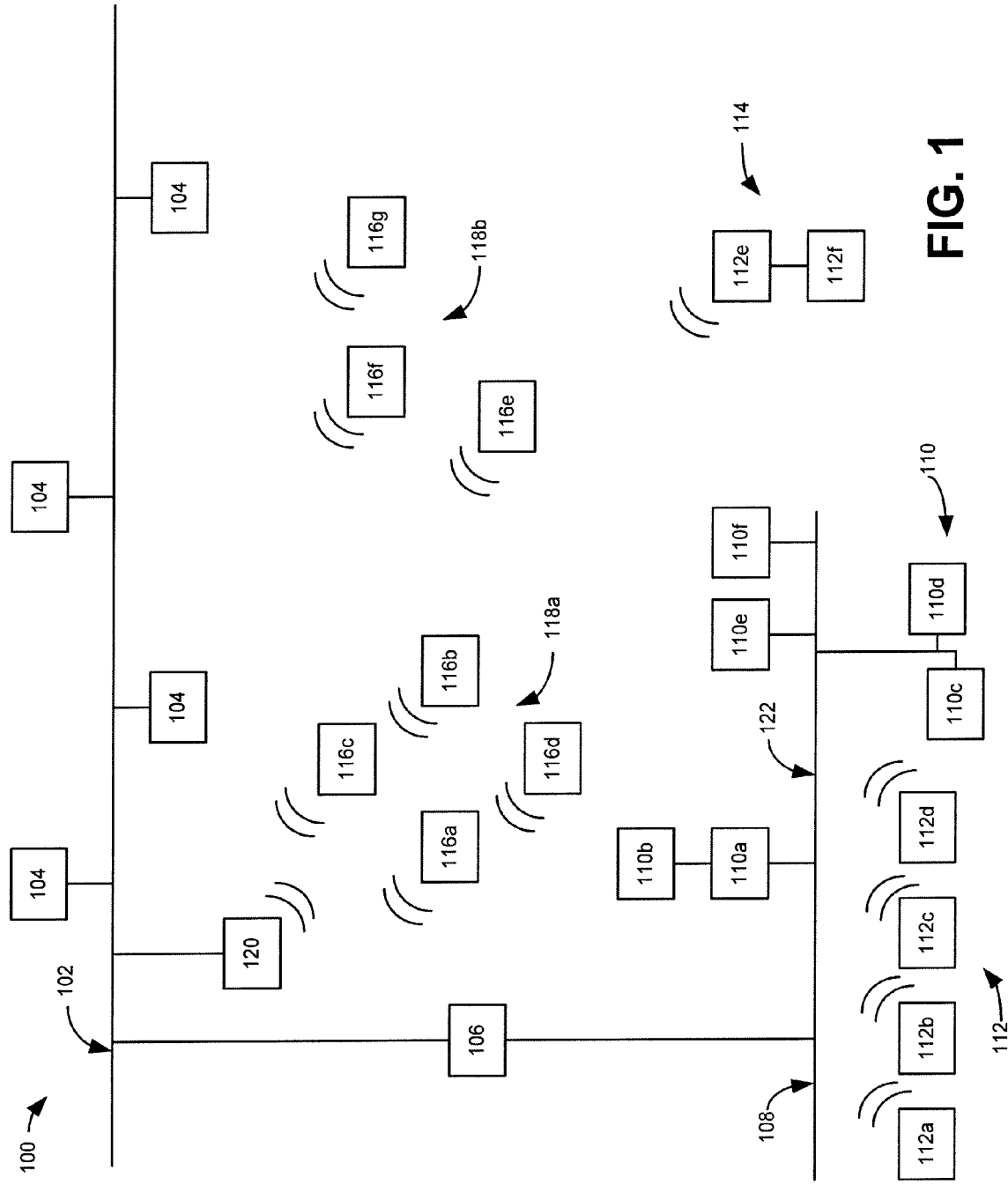
FIG. 1 illustrates an embodiment of a building automation system constructed in a disclosure provided herein.

The embodiments discussed herein include automation components, wireless devices and transceivers. The devices may be IEEE 802.15.4/ZigBee-compliant automation components such as: a personal area network (PAN) coordinator which may be implemented as a field panel transceivers (FPX); a full function device (FFD) implemented as a floor level device transceiver (FLNX); and a reduced function device (RFD) implemented as a wireless room temperature sensor (WRTS) that may be utilized in a building automation system (BAS). The devices identified herein are provided as an example of automation components, wireless devices and transceivers that may be integrated and utilized within a building automation system embodying the teachings disclosed herein and are not intended to limit the type, functionality and interoperability of the devices and teaching discussed and claimed herein.

One exemplary building automation system that may include the devices and be configured as described above is the APOGEE® system provided by Siemens Building Technologies, Inc. The APOGEE® system may implement RS-485 wired communications, Ethernet, proprietary and standard protocols, as well as known wireless communications standards such as, for example, IEEE 802.15.4 wireless communications which are compliant with the ZigBee standards and/or ZigBee certified wireless devices or automation components. ZigBee standards, proprietary protocols or other standards are typically implemented in embedded applications that may utilize low data rates and/or require low power consumption. Moreover, ZigBee standards and protocols are suitable for establishing inexpensive, self-organizing, mesh networks which may be suitable for industrial control and sensing applications such as building automation. Thus, a building automation system such as the APOGEE® system configured in compliance with ZigBee standards or protocols may require limited amounts of power allowing individual wireless devices, to operate for extended periods of time on a finite battery charge.

The wired or wireless devices such as the IEEE 802.15.4/ZigBee-compliant automation components may include, for example, an RS-232 connection with an RJ11 or other type of connector, an RJ45 Ethernet compatible port, and/or a universal serial bus (USB) connection. These wired, wireless devices or automation components may, in turn, be configured to include or interface with a separate wireless transceiver or other communications peripheral thereby allowing the wired device to communicate with the building automation system via the above-described wireless protocols or standards. Alternatively, the separate wireless transceiver may be coupled to a wireless device such as a IEEE 802.15.4/ZigBee-compliant automation component to allow for communications via a second communications protocol such as, for example, 802.11x protocols (802.11a, 802.11b . . . 802.11n, etc.) These exemplary wired, wireless devices may further include a man-machine interface (MMI) such as a web-based interface screen that provide access to configurable properties of the device and allow the user to establish or troubleshoot communications between other devices and elements of the BAS.

FIG. 1 illustrates an exemplary building automation system or control system 100 that may incorporate the methods, systems and teaching provided herein. The control system 100 includes a first network 102 such as an automation level network (ALN) or management level network (MLN) in communication with one or more controllers such as a plurality of terminals 104 and a modular equipment controller (MEC) 106. The modular equipment controller or controller 106 is a programmable device which may couple the first network 102 to a second network 108 such as a floor level network (FLN). The second network 108, in this exemplary embodiment, may include a wired network 122 that connects to building automation components 110 (individually identified as automation components 110a to 110f). The second network 108 may further be coupled to wireless building automation components 112. For example, the building automation components 112 may include wireless devices individually identified as automation components 112a to 112f. In one embodiment, the automation component 112f may be a wired device that may or may not include wireless functionality and connects to the automation component 112e. In this configuration, the automation component 112f may utilize or share the wireless functionality provided by the automation component 112e to define an interconnected wireless node 114.

The control system 100 may further include automation components generally identified by the reference numerals 116a to 116g. The automation components 116a to 116g may be configured or arranged to establish one or more networks or subnets 118a and 118b. The automation components 116a to 116g such as, for example, full or reduced function devices and/or a configurable terminal equipment controller (TEC), cooperate to wirelessly communicate information between the second network 108, the control system 100 and other devices within the mesh networks or subnets 118a and 118b. For example, the automation component 116a may communicate with other automation components 116b to 116d within the mesh network 118a by sending a message addressed to the network identifier, alias and/or media access control (MAC) address assigned to each of the interconnected automation components 116a to 116g and/or to a field panel 120. In one configuration, the individual automation components 116a to 116d within the subnet mesh network 118a may communicate directly with the field panel 120 or, alternatively, the individual automation components 116a to 116d may be configured in a hierarchal manner such that only one of the components for example, automation component 116c, communicates with the field panel 120. The automation components 116e to 116g of the mesh network 118b may, in turn, communicate with the individual automation components 116a to 116d of the mesh network 118a or the field panel 120.

The automation components 112e and 112f defining the wireless node 114 may wirelessly communicate with the second network 108, and the automation components 116e to 116g of the mesh network 118b to facilitate communications between different elements, section and networks within the control system 100. For example, the automation components 112, 116 may be configured to communicate software and/or firmware between each other, the field panel 120, the second network 108, one or more of the controllers 106, or terminals 104 or other component of the control system 100. The software may be stored in volatile memory and/or the firmware may be stored in non-volatile memory and executed by a processor (not shown) to upgrade the software or firmware associated with the automation components 112, 116. As used herein, the communicated software or firmware may be embedded software, individual software instructions, commands, functions, segments or modules, software packets, subroutines, binaries, images, data, databases and/or complete upgrades of the software/firmware operatively resident on the receiving automation component. Wireless communication between individual the automation components 112, 116 and/or the mesh networks 118a, 118b may be conducted in a direct or point-to-point manner, or in an indirect or routed manner through the nodes or devices comprising the nodes or networks 102, 108, 114 and 118. In an alternate embodiment, the wired network 122 is not provided, and further wireless connections may be utilized.

Figure 2:
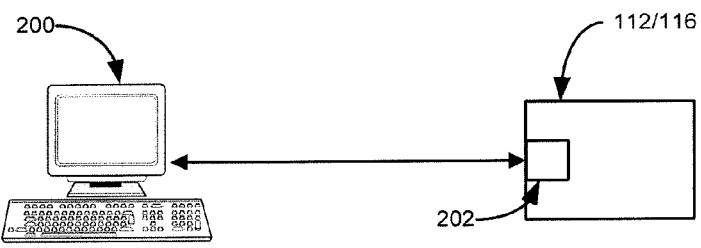
FIGS. 2 to 8 illustrate exemplary system and communications configurations.

FIG. 2 illustrates one communication configuration which may be implemented to facilitate transmittal and upgrade of software and/or firmware between components of the control system 100. For example, a controller or computer 200 may include a communications port such as, for example, a serial or COM port, a USB port, etc., adapted for wired communications with a port 202 provided on one of the automation components 112, 116. The computer 200 which may be a terminal 104 operating within the first network 102 may act as a source node to centrally store and/or distribute the software or firmware to be provided to the automation components 112, 116 (alternate source node configurations are illustrate and discussed in connection with FIG. 5), and may utilize a generic file transfer protocol (ftp) application, a HyperTerminal communications program bundled as a part of the MICROSOFT® WINDOWS® or LINUX operating systems, or any other communications program capable of data point-to-point or point-to-many transfer. The communications program can be utilized to transfer information such as software or firmware from the source node or computer 200 to the applicable automation component 112, 116. The transferred software or firmware can be temporarily stored in ROM, PROM, EPROM, EEPROM, flash or battery backed-up RAM or any other non-volatile computer memory portion of the automation component 112, 116. The memory may include a bootloader program executable on a processor and configured to run or install the transferred software or firmware necessary to reprogram or upgrade all or a portion of the software or firmware executed by the automation component 112, 116. The upgrade may, for example, occur when the components are inactive to maximize processor performance, or it may occur in the background while the components are operating to provide continuity of performance. The upgrades may be provided to the automation component 112, 116 in order to: provide or enable new firmware features; ensure compatibility with new or updated communications standards or protocols; implement a new operating system or software.

Figure 3:
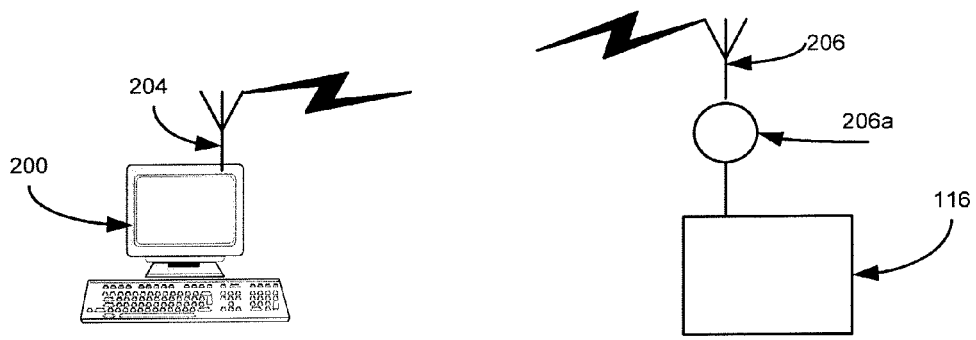

FIG. 3 illustrates another communication configuration implemented to facilitate transmittal and upgrade of software and/or firmware between components of the control system 100. In this embodiment, the source node or computer 200 is coupled to, includes, or is in communication with, a wireless transceiver 204. The wireless transceiver 204 may be an internal plug-in, and external plug-in or other device connected to the computer 200. The wireless transceiver 204 may be utilized to provide the computer 200 with two-way communications with other devices within a given area or a prescribed communications network, such as, for example, one or more of the mesh networks 118a, 118b. The computer 200, in this embodiment, operates as a source node configured to disseminate the upgrade software or firmware via a communications program to a wireless transceiver 206 coupled via an external connector 206a to the automation component 116 to be upgraded or reprogrammed. The transferred software or firmware may be executed via a bootloader program resident or stored in a boot block portion of the memory provided in the automation components 116. The wireless transceivers 204 and 206 can be integral components of the computer 200 and the automation component 116, respectively, or add-on components connected thereto. In an alternate scenario, the wireless transceivers 204 and 206 may cooperate to access a third wireless transceiver portion of another wireless transceiver (not shown). As used herein, wireless devices may identify an automation component 116 in which the wireless transceiver 206 is both an add-on component and an integral component of the device architecture. Thus, regardless of the structure or location of the wireless transceiver, the upgrade software or firmware can be communicated through one or more of the mesh networks 118a, 118b to various communicatively coupled wireless devices and automation components 116.

Figure 4:
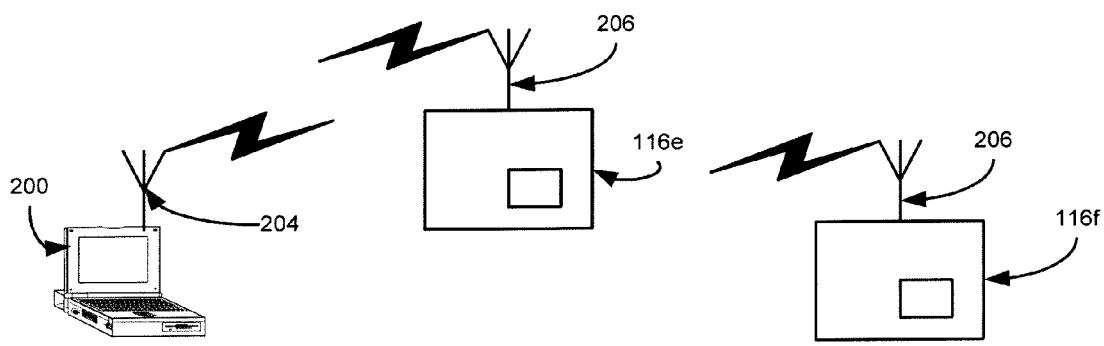

FIG. 4 illustrates yet another communication configuration implemented to facilitate transmittal and upgrade of software and/or firmware between components of the control system 100. The computer 200 or source node may be a portable or a laptop computer suitable for transport throughout the structure controlled or monitored by the control system 100. The laptop 200 may further include an integral wireless transceiver 204 such as a wireless local area network (WLAN) connector or adaptor; a BLUETOOTH® adaptor, an infrared port, a wide area network (WAN) adaptor, an 802.15.4/ZigBee adaptor, 802.15.4/Proprietary Mesh Stack adaptor or other connection or communication device existing now or in the future. The wireless transceiver 204 may provide for communications between the source node 200 storing the upgrade software, firmware or instructions, and the automation component 116e. The automation component 116e, in this configuration, may contain or be currently executing software, firmware such as an application binary. For example, if the automation component 116e is late generation (recent) device, the application binary executing on the device may be the most up-to-date software or firmware operating within control system 100. In this instance, it may be desirable to provide this up-to-date firmware to other devices within the mesh network 118b or network 108.

The computer 200 may execute a wireless service tool instructed or configured to initiate, either manually or automatically, or otherwise establish communications with the automation component 116e and create a copy or clone of the up-to-date software or firmware. The up-to-date software or firmware may, in turn, be communicated from the automation component 116e to a destination automation component 116f. At this point, the transferred software or firmware may, for example, be executed via a bootloader program resident or stored in a boot block portion of the automation component's 116*f* memory. In an alternate scenario, the destination automation component may be another automation component 116*g* (not explicitly shown in FIG. 4) within the mesh network 118*b*, and the automation component 116*f* may simply act as a relay for the communicated software or firmware. In yet another alternate scenario, multiple automation components 116 may be upgraded serially (one by one) or in parallel (all at the same time) with the software, firmware or instruction packet(s) provided by automation component 116*e*. In yet another alternate scenario, the destination automation component 112*e* may be directly wired, networked or otherwise coupled to a wireless device or automation component 112*f* to allow the upgrade to be wirelessly communicated to the automation component 112*f* through the component 112*e*.

Figure 5:
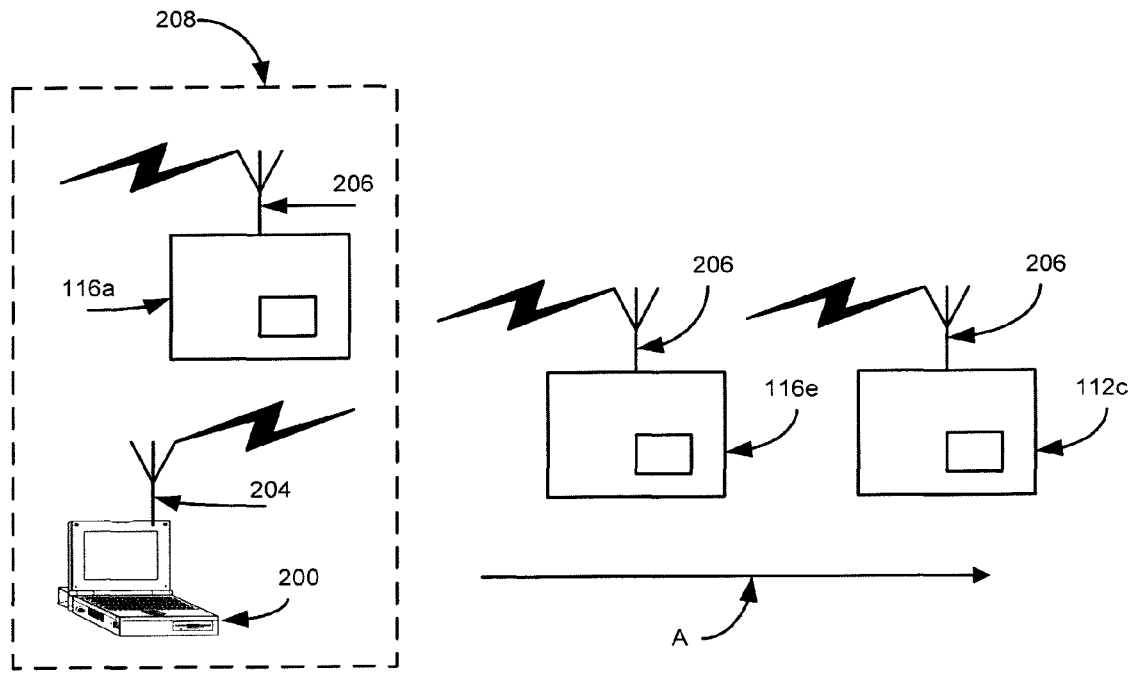

FIG. 5 illustrates yet another communication configuration implemented to facilitate transmittal and upgrade of software and/or firmware between components of the control system 100. In this configuration, the software or firmware upgrade resides on the computer 200 or a communicatively connected automation component 116*a*. The computer 200 and the automation component 116*a* may form a source node or cluster 208. The source node 208 may be any logically or communicatively coupled group of computers, automation components and/or controllers that store or contain source software instructions and/or firmware for distribution. A control or scheduling program (not shown) may execute on one of the devices within the source node 208. The scheduling program may automatically connect to all of the automation components 112, 116 within the control system 100. Alternatively the scheduling program may be configured to selectively connect to specific automation components such as, for example, the automation components 116*e*, 112*c*, based on criteria such as: an update schedule, hardware versions or capabilities, network address or any other method of selectively connecting. The software and/or firmware for distribution may be automatically communicated via the scheduling program to mass download, reflash the new software and/or firmware or update the selected automation components in accordance with the defined schedule or criteria. As indicated by the arrow A, the scheduling program may be configured to serially (one at a time) update the each of the identified or selected automation components within a designated mesh network 118*b*, network 108 or control system 100. Upon completion of the mass reflash or update, the scheduling program may log or otherwise inform the user of the system status. For example, the user may be shown that reflash or update status which may include information such as, upgrade success or failure, or firmware version, of each automation component within the mesh network 118

Figure 6:
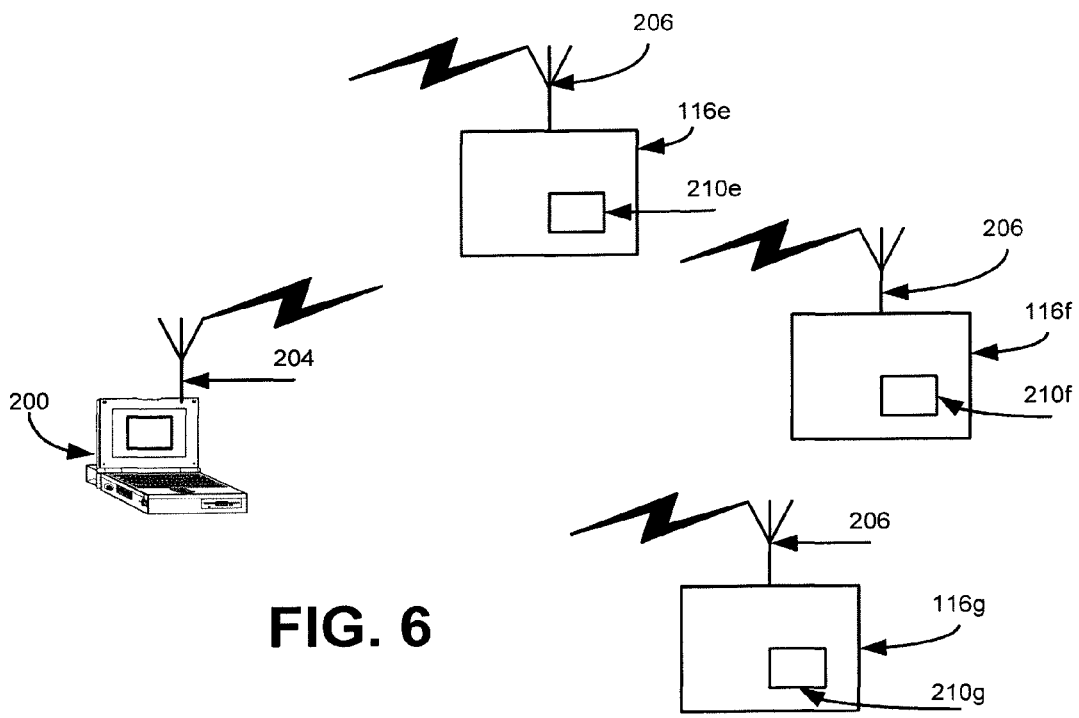

FIG. 6 illustrates yet another communication configuration implemented to facilitate a broadcast reflash or update of the wireless automation components 112, 116 operating within the control system 100. In this configuration, the software or firmware upgrade may reside on the computer 200, on one of the automation components 112, 116, or within the cluster or source node 208. The scheduling or control program, as discussed above, may execute on the computer 200 or one of the other devices with the source node 208. In one example, the scheduling program could establish communication with a particular type of automation component with the mesh network 118*b*. Thus, communications may be established with reduced function devices such as, for example, wireless room temperature sensors, identified as the automation components 116*e*, 116*f* and 116*g*. The scheduling program may communicate the software and/or firmware to be updated to designated memory space 210*e*, 210*f* and 210*g* available within each of the devices. The communicated software may, in turn, be executed and/or uncompressed (from, for example, an fdata/file format) in the background; thereby allowing the automation components 116*e*, 116*f* and 116*g* to continue operating normally until the upgrade has been completed. In this configuration, all of the identified or selected wireless devices or automation components 112, 116 can be simultaneously upgraded or reflashed to a new software/firmware revision level in a single operation.

Figure 7:
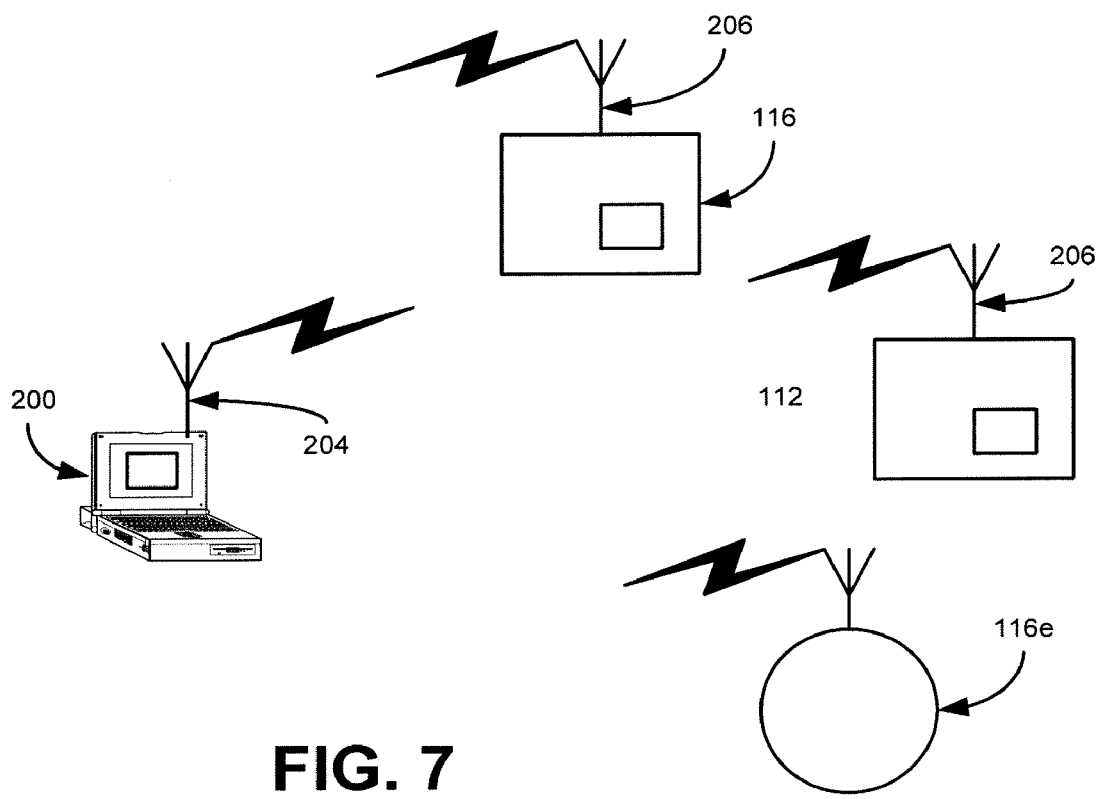

FIG. 7 illustrates yet another communication configuration implemented to facilitate a virus reflash or update of the wireless automation components 112, 116 operating within the control system 100. In this configuration, the software or firmware upgrade may reside on the computer 200, on one of the automation components 112, 116 or within the cluster or node 208. The scheduling or control program can cause one of the automation components 116*e* to fully or partially upgrade. The upgraded automation component 116*e* may, in turn, initiate a full or partial upgrade or reflash of the software or firmware executed by one or more of the automation components 112, 116. Thus, the upgrade would be communicated or spread between the automation components 112, 116 within the control system 100. As previously discussed the automation components 112, 116 to be upgraded may, for example, be identified within the scheduling or control program, may be identified by the upgraded automation component 116*e*, or may simply accept all communicated software and/or firmware upgrades and initiate a check of confirmation of the information prior to implementation or execution.

Figure 8:
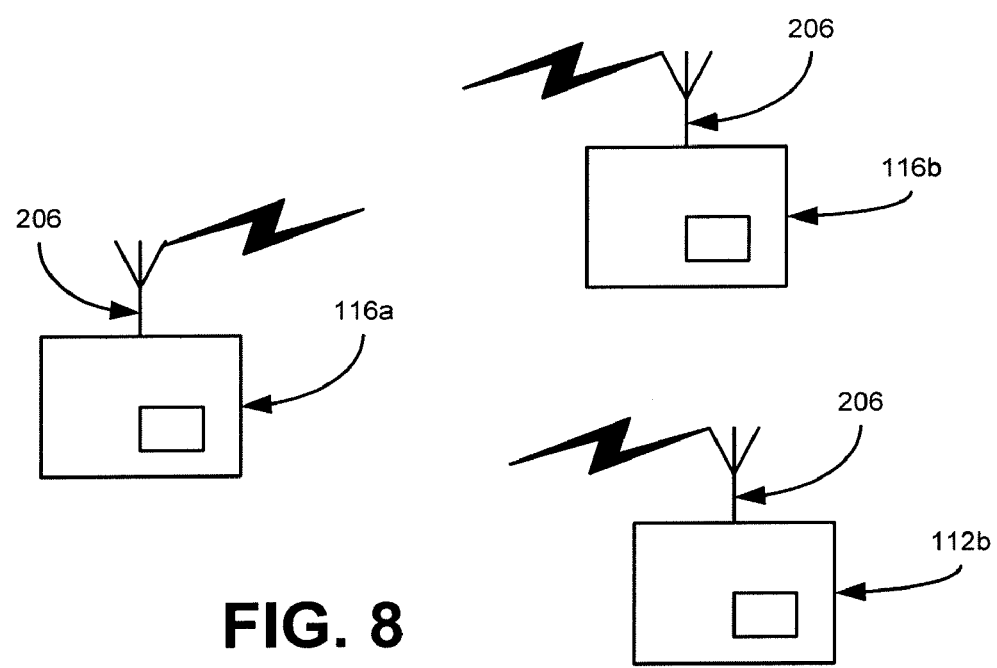

FIG. 8 illustrates yet another communication configuration implemented to facilitate an automatic reflash or update of the software or firmware executed by one or more of the wireless automation components 112, 116 operating within the control system 100. For example, if a new automation component 116*a* were to be installed within the mesh network 118*a*, the hardware and firmware capabilities of this device could be available to the devices with the mesh network 118*a* or communicatively connected to the mesh network 118*a*. Thus, if the new automation component 116*a* includes an updated or newer version of operating software or firmware, this new software or firmware, could be provided to upgrade all or selected devices in communication with the mesh network 118*a* or the network 108. In this way, automation devices 116*d* and 112*b* may be automatically upgraded to include the latest firmware by simply installing a new device. This configuration could be implemented without the need for a separate computer 200 and may simply rely on the intelligence and capabilities of the automation components 112, 116 themselves.

It should be understood that various changes and modifications to the presently preferred embodiments described herein will be apparent to those skilled in the art. For example, the elements of these configurations could be arranged and interchanged in any known manner depending upon the system requirements, performance requirements, and other desired capabilities. Moreover the upgrade operations could be performed manually utilizing known communications tools provided in commercially available operating systems. Alternatively, the upgrade operations could be performed via one of the terminals 104 operating in conjunction with the control system 100. These upgrade operation and communications may be performed manually by a user interacting with the control system 100 and the automation components 112, 116, or automatically by configuring the control program to run or execute these operations in a predefined manner. Well understood changes and modifications can be made based on the teachings and disclosure provided by the present inven-

What is claimed is:

1. A method for wireless communication within a building automation system, the method comprising:
   establishing a first wireless communication connection between a first automation component and a controller, wherein the controller is configured to communicate with the first automation component according to a first wireless communication protocol;
   establishing a second wireless communication connection between a second automation component and the first automation component, wherein the first automation component is configured to communicate with the second automation component according to a second wireless communication protocol which is different than the first wireless communication protocol;
   communicating a viral upgrade packet to the first automation component from the controller, wherein the viral upgrade packet is configured to perform either a partial or full upgrade on the first automation component; and
   executing the viral upgrade packet, wherein the viral upgrade packet is programmed to upgrade the first automation component and wherein the upgraded first automation component executes the viral upgrade packet to perform either a partial or full upgrade on the second automation component.

2. The method of claim 1, wherein the communication connection is established between a communication port disposed in communication with the controller and a serial port disposed in communication with the automation component.

3. The method of claim 1, wherein the communication connection is a wired communication connection.

4. The method of claim 1, wherein the first automation component is in communication with at least a third automation component and wherein the first automation component communicates the viral upgrade packet to the third automation component.

5. The method of claim 1, wherein the viral upgrade packet is communicated to the automation component comprises a firmware upgrade.

6. The method of claim 5, wherein the automation component comprises a processor and a memory in communication with the processor, and wherein the memory is configured to store the firmware upgrade and the processor is configured to execute the stored firmware upgrade.

7. The method of claim 5, wherein the controller is configured to execute the firmware upgrade and communicate the results to the first automation component via the established communication connection.

8. The method of claim 1, wherein the establishing a communication connection comprises communicating with a wireless adaptor.

9. The method of claim 1, wherein executing comprises executing a bootloader configured to perform a firmware upgrade based on the viral upgrade packet.

10. The method of claim 1, wherein the first automation component is coupled to a building automation component configured to be wirelessly upgraded via the first automation component.

11. The method of claim 1, wherein the controller is selected from the group consisting of: a third automation component, a source node, a terminal, and a portable computer.

12. A building automation system comprising:
   a controller configured to provide a virus software upgrade module;
   a first wireless transceiver in communication with the controller, wherein the first wireless transceiver is configured to communicate the virus software upgrade module according to a first communication protocol;
   a second wireless transceiver in communication with the controller, wherein the second wireless transceiver is configured to communicate the virus software upgrade module according to a second communication protocol;
   a first wireless device in communication with the first wireless transceiver, the first wireless device upgradeable in response to receiving the communicated virus software upgrade module;
   a second wireless device in communication with the second wireless transceiver, the second wireless device upgradeable in response to receiving the communicated virus software upgrade module; and
   a third wireless device in communication with the first wireless device according to the first communication protocol, wherein the third wireless device is upgradeable in response to the virus software upgrade module provided by the first wireless device.

13. The system of claim 12, wherein the controller and the wireless transceiver are a portable computer.

14. The system of claim 12, wherein the third wireless device is in communication with the controller, and wherein the third wireless device is configured to provide the virus software upgrade module to the controller.

15. The system of claim 12, wherein the first wireless device comprises a processor and a memory in communication with the processor and wherein the memory is configured to store the virus software upgrade module and the processor is configured to execute the stored virus software upgrade module.

16. The system of claim 15, wherein the memory stores a bootloader configured to execute on the processor to perform a firmware upgrade based on the virus software upgrade module.

17. The system of claim 12, wherein the controller is configured to execute a firmware upgrade and communicate the results to the first wireless device via the wireless transceiver.

18. The system of claim 12, wherein the first wireless device is a wireless adaptor coupled to a building automation component.

19. A method for wireless communication within a building automation system, the method comprising:
   providing a viral firmware upgrade to a building automation component;
   wirelessly communicating the viral firmware upgrade to a first wireless device utilizing a first communication protocol;
   executing the viral firmware upgrade on a processor within the first wireless device;
   wirelessly communicating the viral firmware upgrade from the first wireless device to a second wireless device utilizing a second communication protocol; and
   executing the viral firmware upgrade on a processor within the second wireless device, wherein the viral firmware upgrade is programmed to upgrade the second wireless device.

20. The method of claim 19, wherein providing is performed by a portable computer.

21. The method of claim 19, wherein providing is performed by a third wireless device in communication with a controller.

22. The method of claim 21, wherein the controller is selected from the group consisting of: a fourth automation component, a source node, a terminal, and a portable computer.

23. The method of claim 19, wherein the building automation component is a third wireless device in wireless communication with first wireless device.

24. The method of claim 19, wherein providing is performed by executing a plurality of software instructions on a controller in communication with the building automation component.

* * * * *